No. 700,665. Patented May 20, 1902.
A. LINDGREN.
LISTER CULTIVATOR.
(Application filed Feb. 18, 1902.)
(No Model.) 2 Sheets—Sheet 1.
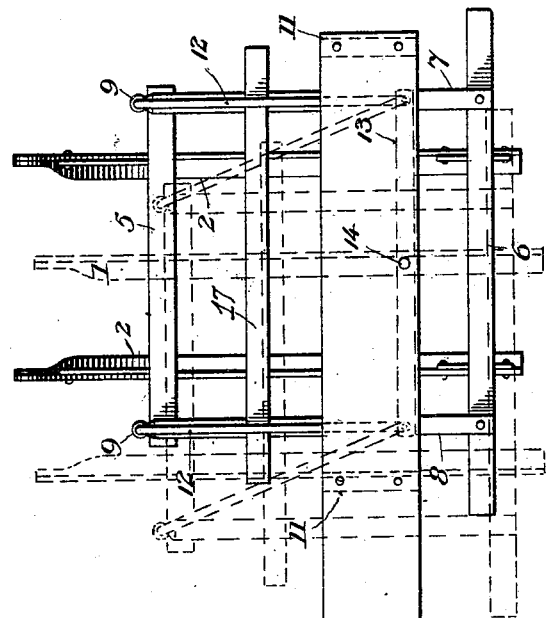
Fig.1.
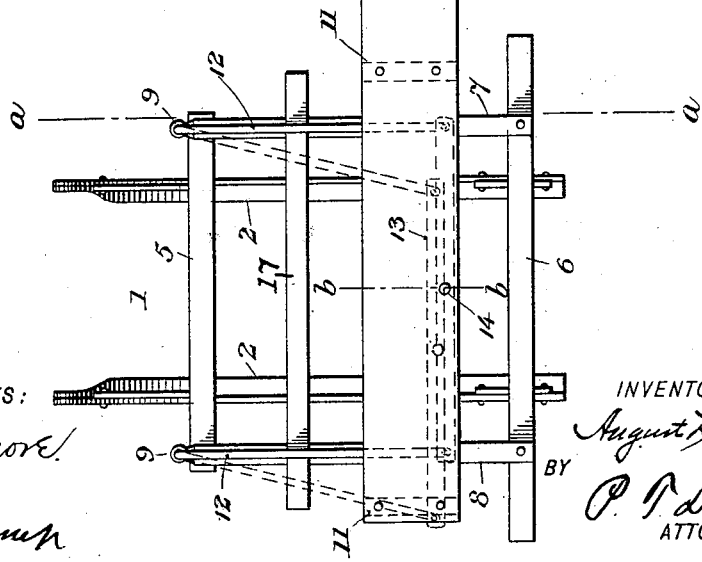
WITNESSES:
F. S. Elmore
N. R. Kennup
INVENTOR
August Lindgren
BY
P. T. Dodge
ATTORNEY
THE NORRIS PETERS CO., PHOTO-LITHO., WASHINGTON, D. C.

No. 700,665. Patented May 20, 1902.
A. LINDGREN.
LISTER CULTIVATOR.
(Application filed Feb. 18, 1902.)
(No Model.) 2 Sheets—Sheet 2.
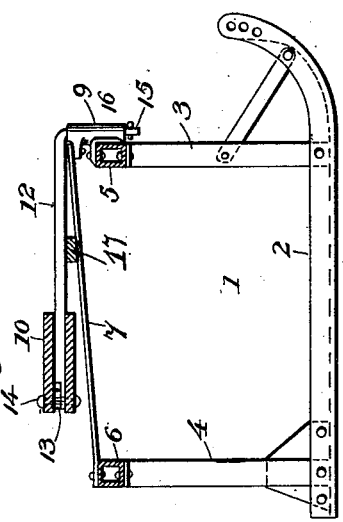
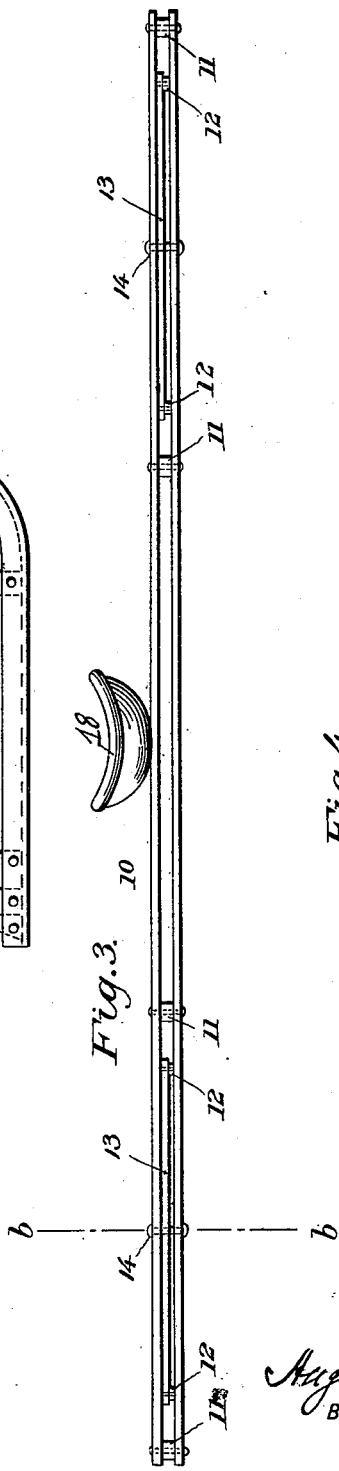
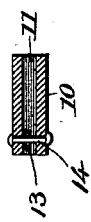
WITNESSES:
INVENTOR
August Lindgren
BY
ATTORNEY

UNITED STATES PATENT OFFICE.

AUGUST LINDGREN, OF MOLINE, ILLINOIS, ASSIGNOR TO THE MOLINE PLOW COMPANY, A CORPORATION OF ILLINOIS.

LISTER-CULTIVATOR.

SPECIFICATION forming part of Letters Patent No. 700,665, dated May 20, 1902.

Application filed February 18, 1902. Serial No. 94,607. (No model.)

*To all whom it may concern:*

Be it known that I, AUGUST LINDGREN, of Moline, county of Rock Island, and State of Illinois, have invented a new and useful Improvement in Lister-Cultivators, of which the following is a specification.

This invention relates to cultivators, and has reference more particularly to that type of cultivators designed for listed corn and comprising a plurality of flexibly-connected frames adapted to straddle the rows of corn and equipped with cultivating devices arranged to operate on the opposite sides of the rows to loosen the soil and remove the weeds, &c.

The invention consists of improved means for so connecting these frames that although they are compelled to move together they are capable of relative independent movements in various directions, to the end that they may readily adapt themselves to any unevenness of the ground and irregularities in the distance between the rows.

The invention consists also in the details of construction and combination of parts hereinafter described and claimed.

In the accompanying drawings, Figure 1 is a top plan view of my improved machine. Fig. 2 is a longitudinal vertical sectional elevation on the line *a a* of the preceding figure. Fig. 3 is a rear view of the connecting seat-bar. Fig. 4 is a vertical section through the same on the line *b b* of Figs. 1 and 3.

Referring to the drawings, 1 1 represent two cultivator-frames, which may be of any suitable form and construction which will adapt them to straddle the rows of the plants. Each of these frames in the present instance consists of two parallel metallic runners 2 2, each having firmly secured to it a front vertical standard 3 and a rear standard 4, which are connected, respectively, by a front horizontal bar 5 and a rear bar 6, as clearly shown in Figs. 1 and 2. The ends of the bars 5 and 6 extend some distance beyond the runners and are connected rigidly together by fore and aft parallel rods 7 and 8, the rear ends of these rods being fixed to the cross-bar 6, while their forward ends are fixed to castings 9, which are in turn firmly secured to the front bar 5.

Overlying the two frames and connecting them transversely is a seat-bar 10, comprising two boards placed one over the other and spaced apart by cleats 11, firmly fixed between the boards at intervals, as shown more particularly in Fig. 3. This seat-bar is connected with the respective frames by two pairs of parallel fore and aft links 12, the rear ends of which extend between the boards of the bar, where they are joined together by a strap 13, pivoted at its ends to the ends of the links and at its center to the seat-bar by means of a vertical pivot 14.

The front ends of the parallel links are turned downward, as at 15, in the form of journals, which are seated loosely each in a vertical tubular bearing 16, formed in the brackets 9, before alluded to.

From the construction described it will be seen that the seat-bar is connected pivotally with the cultivator-frames by links which have a free pivotal movement on vertical axes, as at 9, situated in front of the seat-bar. Consequently the seat-bar and frames may move relatively transversely, as shown by dotted lines in Fig. 1, and also longitudinally, the frames at all times maintaining their alinement. This permits the frames to move to and from each other and one in front of the other and to conform readily to the unevenness of the ground.

In the relative movements of the frames and seat-bar the fore and aft links 12 are supported about midway of their length and slide on transverse supporting-bars 17, fixed to the bars 7 of the runner-frames, so that the seat-bar is given a certain degree of spring, which adds to the comfort of the driver, who occupies a seat 18, fixed to the bar between the two frames.

The cultivator-frames may be equipped in any suitable manner with appropriate cultivating-tools, such as blades or disks, arranged to operate at the sides of the rows of plants in the usual and well-known manner, and the number of frames may be increased and their construction modified to adapt the machine to work more than two rows without departing from the limits of my invention.

Having thus described my invention, what I claim is—

1. In a lister-cultivator the combination with a plurality of cultivating-frames, of a transverse connecting-bar, and a pivotal link connection between the frames and the bar.

2. In a lister-cultivator the combination with a plurality of frames, of a transverse connecting-bar, links jointed at their forward ends to the frames, and a jointed connection between the opposite ends of the links and the bar.

3. In a lister-cultivator the combination with a plurality of cultivator-frames, of a transverse connecting-bar, and parallel links connecting each frame with the bar.

4. In a lister-cultivator the combination with the cultivator-frame, of a transverse bar, parallel links connected at their front ends to the frame, and a connecting device joining the rear ends of the links and having a pivotal connection with the cross-bar.

5. In a lister-cultivator the combination with a plurality of frames, of a transverse connecting-bar, pairs of links jointed at one end to the frame, and a rod pivotally connecting the opposite ends of the links and pivoted between its ends to the cross-bar.

6. In a lister-cultivator the combination with a plurality of frames, of a transverse bar comprising two boards spaced apart, links jointed at their front ends to the frames and extending at their rear ends between the boards, and a jointed connection between the links and the boards.

7. In a lister-cultivator the combination with a plurality of frames having vertical bearings, of links having their forward ends extending vertically and mounted in the bearings and extending rearward, a transverse bar common to the frames, and jointed connections between the links and the bar.

8. In combination with a plurality of frames having transverse supporting-bars fixed thereto, a transverse seat-bar and connecting-links jointed respectively to the frames and the bar and resting between their ends on the transverse supporting-bars.

9. In a lister-cultivator the combination with the cultivating-frame provided with a fixed transverse supporting-bar, of fore and aft links jointed at their front ends to the frame and resting between their ends on the fixed bar, and a transverse seat-bar jointed to the rear ends of said links.

10. In a lister-cultivator the combination with a plurality of frames, of a transverse connecting seat-bar, links connecting the bar and frame and movable transversely with reference to the frame, and a fixed support on which the links rest between their ends; whereby the seat-bar is sustained so as to yield vertically.

11. In a lister-cultivator the combination with a plurality of cultivator-frames, of a transverse seat-bar, and connecting devices between the frames and the bar having a free pivotal motion on a vertical axis.

12. In a lister-cultivator the combination with a plurality of cultivator-frames, of a transverse seat-bar, and connecting devices between the frames and the bar having a free pivotal motion on a vertical axis situated in front of the seat-bar.

In testimony whereof I hereunto set my hand, this 27th day of January, 1902, in the presence of two attesting witnesses.

AUGUST LINDGREN.

Witnesses:
 P. M. PRICE,
 L. C. BLANDING.